Feb. 14, 1933.  A. R. MORRILL  1,897,526
AUTOMATIC EDGE TRIMMER
Filed Dec. 6, 1929  5 Sheets-Sheet 4
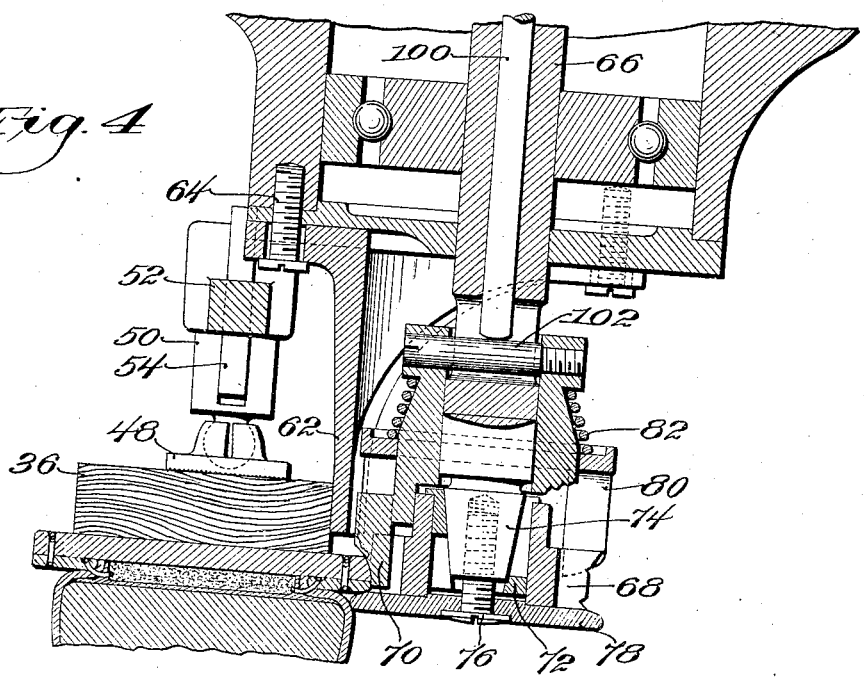
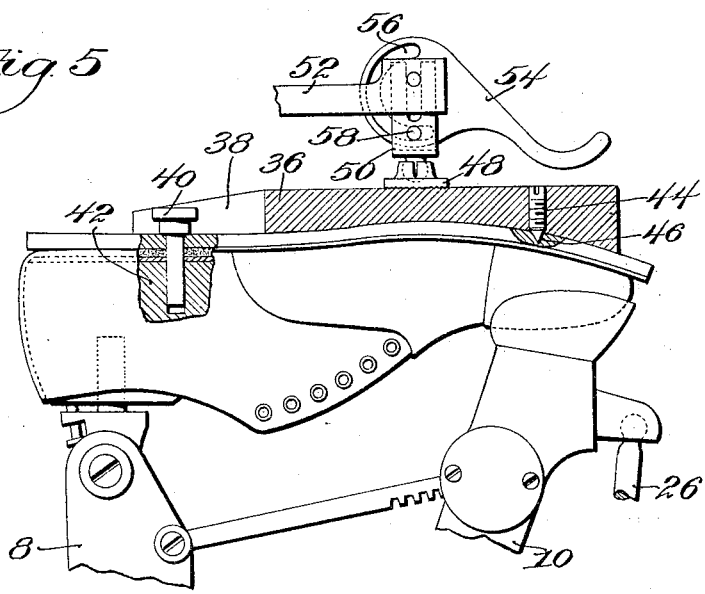

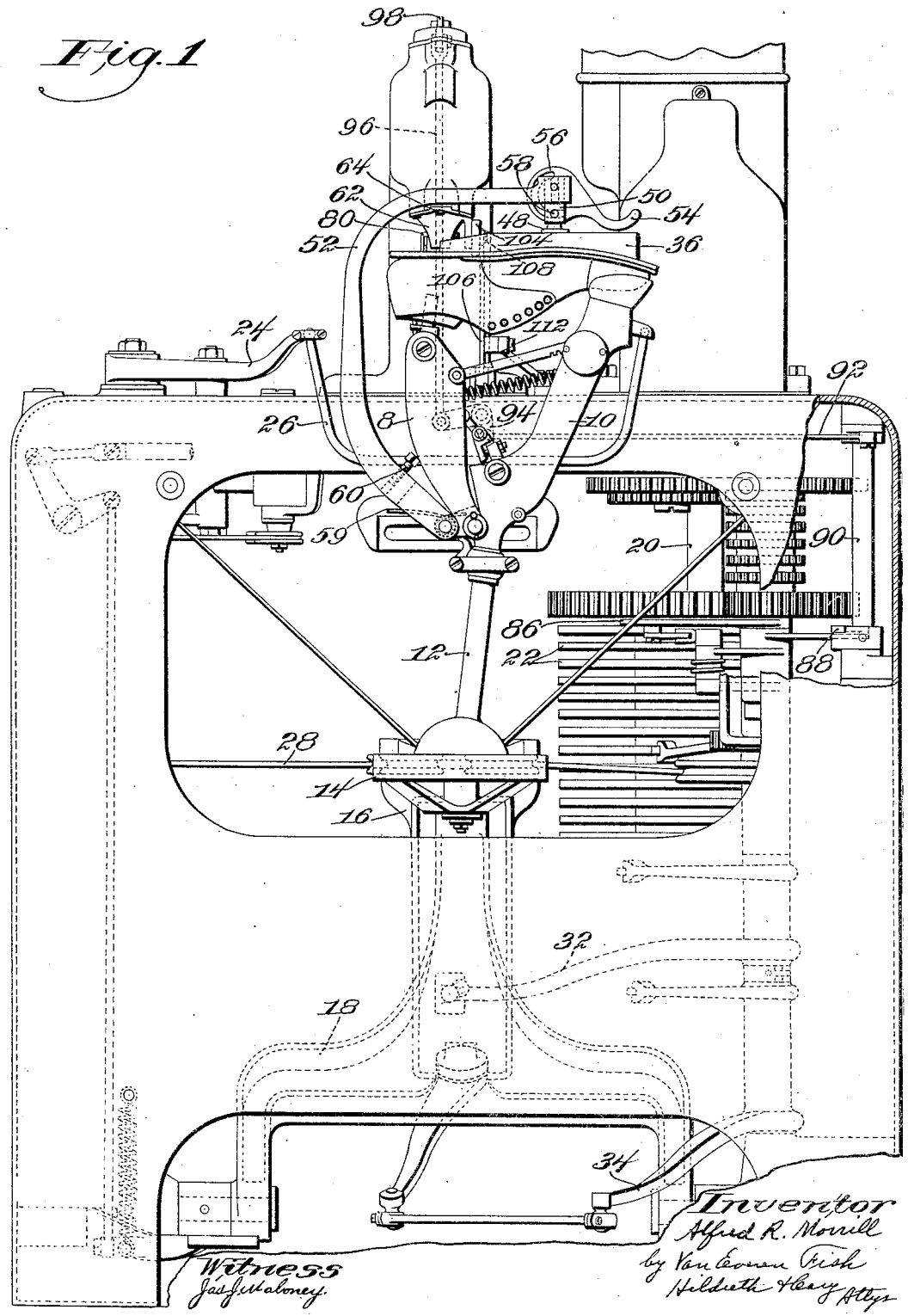

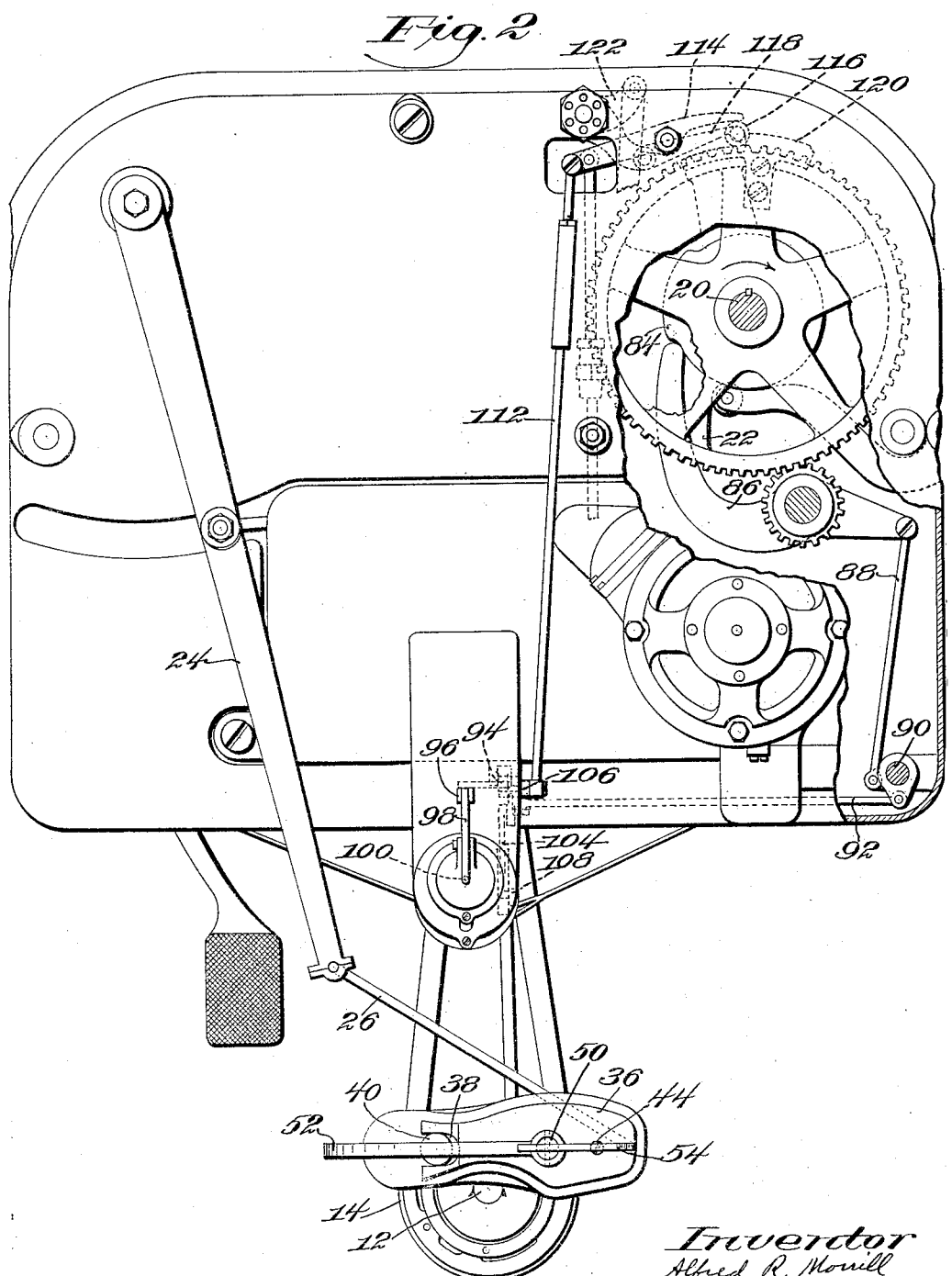

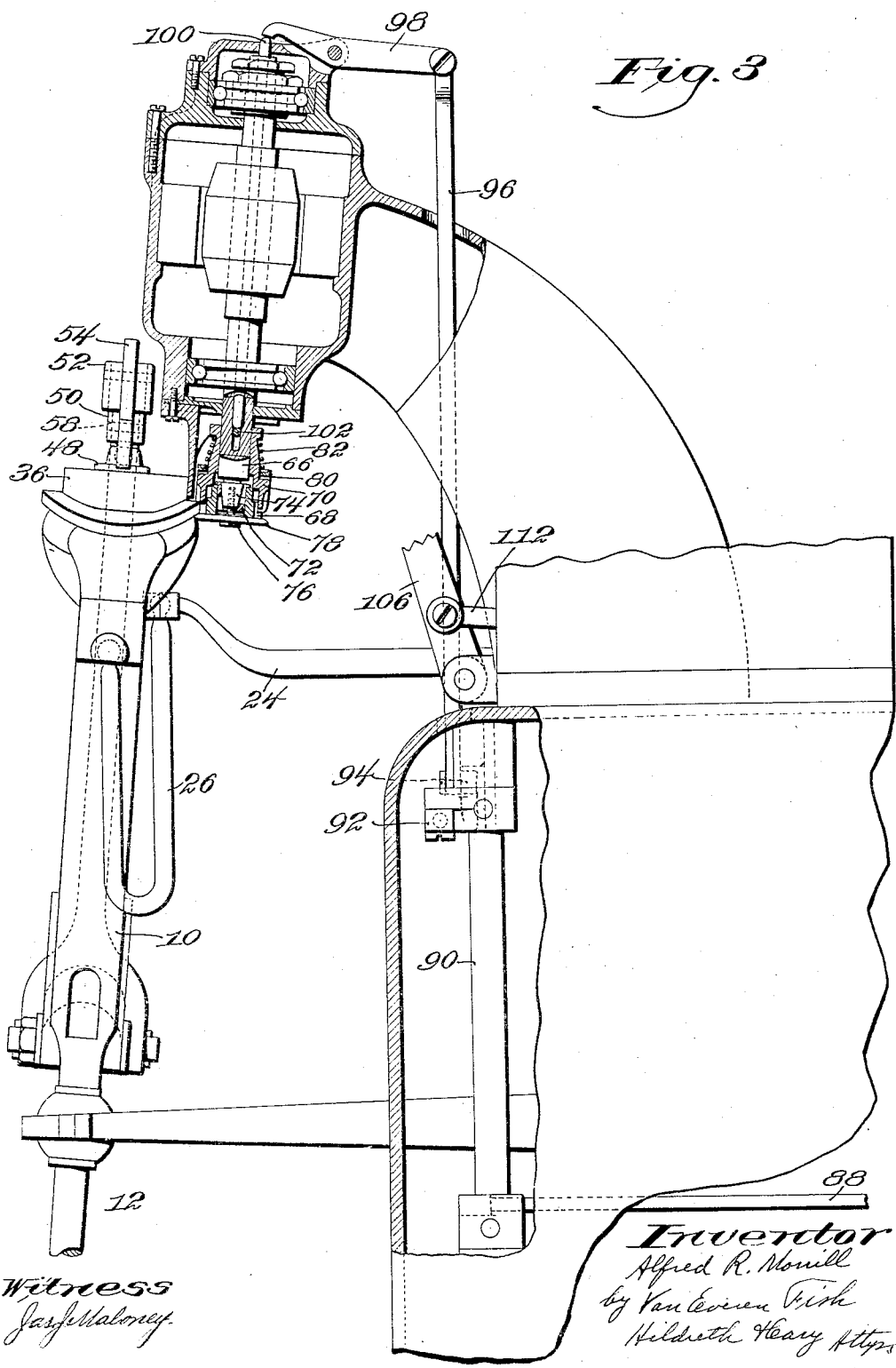

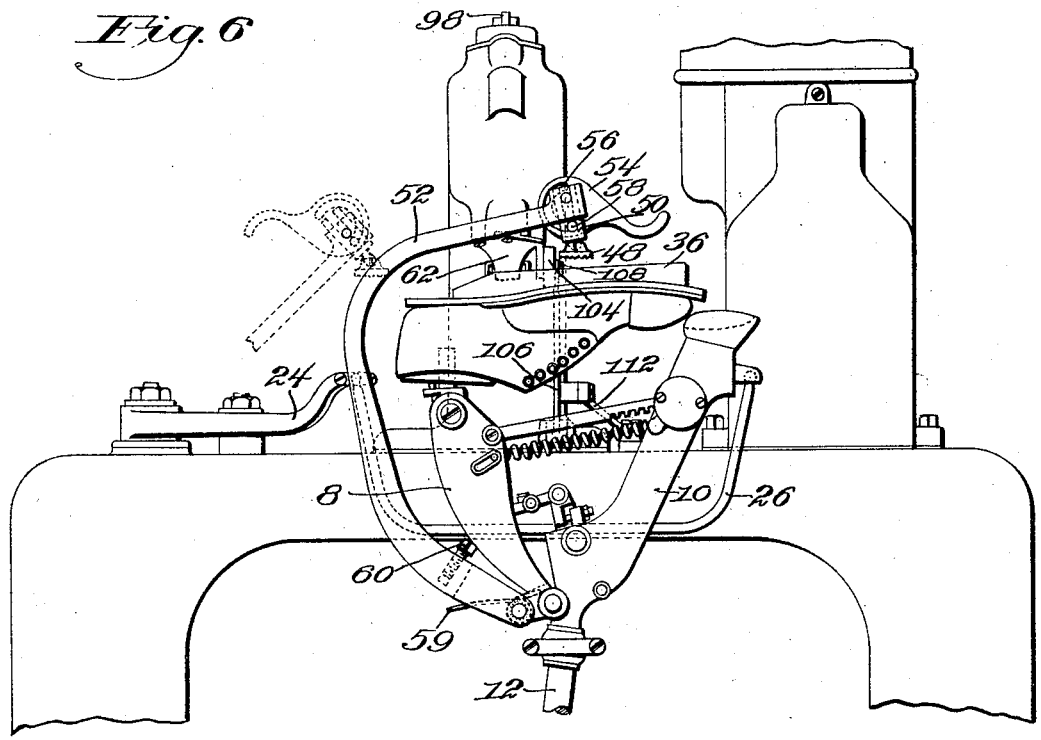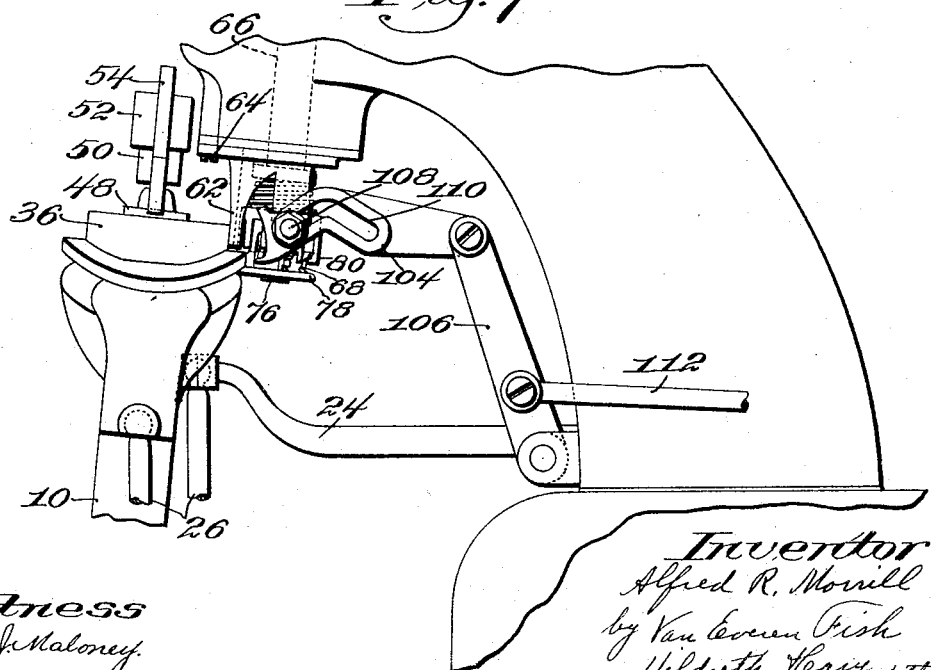

Patented Feb. 14, 1933

1,897,526

UNITED STATES PATENT OFFICE

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY

AUTOMATIC EDGE TRIMMER

Application filed December 6, 1929. Serial No. 412,239.

The present invention relates to machines which are used in the manufacture of shoes to perform certain operations progressively along the bottom margin of a shoe, and is herein disclosed as embodied in an edge trimming machine of the type in which the shoe and the edge trimming devices are moved relatively to transfer the point of operation about the shoe and in which mechanism is provided for relatively moving the edge trimming devices and the shoe to maintain the edge trimming devices and the shoe in proper relative positions at the point of operation as such point is transferred about the shoe. While the invention is intended primarily as an improvement in automatic sole edge trimming machines, certain features of the invention are capable of use in automatic machines for performing operations, other than that of edge trimming, progressively along the bottom margin of the shoe. Certain features of the invention also are capable of use in shoe machines which are not automatic and more particularly in non-automatic edge trimming machines.

The principal object of the present invention is to facilitate the operation of producing a sole edge of the desired outline and to enable this operation to be performed in an accurate and reliable manner to produce satisfactory and uniform results without the use of skilled labor and notwithstanding irregularities in the shoe contours or variations and imperfections in the shape or arrangement of the various parts of the shoe produced during preceding shoe making operations.

Another object of the invention is to improve the construction and operation of automatic machines for performing operations progressively along the bottom margin of the shoe.

Another object of the invention is to improve the construction, arrangement, and operation of the various parts of an edge trimming machine, either automatic or non-automatic, and particularly the construction, arrangement, and operation of the tools which act to trim the forepart and shank of the shoe sole.

With the above objects in view, a feature of the present invention contemplates a construction and arrangement of parts whereby the edge trimming operation is performed upon the outsole of the shoe under the guidance of a templet which has previously been located in predetermined position on the outsole with relation to the last contours. A sole edge having a regular and even outline throughout its extent is thus produced which sole edge has an exact predetermined size and shape and an exact predetermined location with relation to the other parts of the shoe. In the manufacture of a Goodyear welt shoe, an edge trimming machine having this construction and arrangement of parts may be used to perform a trimming operation on the sole, either before or after the stitching of the outsole to the welt. This renders it possible to perform the sole stitching operation under the guidance of a sole edge produced prior to the stitching operation and a subsequent final trimming of the sole edge under the guidance of a templet as set forth in applicant's pending application for a process of making shoes filed of even date herewith.

Certain features of the present invention also contemplate various constructions and arrangements of parts involving the use of a templet located and secured in predetermined position on the bottom of a lasted shoe, which features, while particularly applicable to sole edge trimming machines, are capable of embodiment in machines for performing other operations progressively along the bottom margin of the shoe.

Other features of the invention contemplate the provision in an automatic shoe machine having two tools arranged to act successively along different parts of the bottom margin of a shoe of an improved means for interchanging one tool for the other, and also contemplate the provision in an automatic or non-automatic sole edge trimming machine of a new and improved construction and arrangement of the shank and forepart cutters which enables the tools readily to be brought interchangeably into operative position.

In addition to the features of the invention above indicated, the present invention also consists in certain devices, combinations, and arrangements of parts hereinafter described and claimed which, together with the advantages to be attained thereby, will be readily understood by those skilled in the art from the following description taken in connection with the accompanying drawings, in which Fig. 1 is a view in front elevation of an automatic edge trimming machine embodying the several features of the invention. Fig. 2 is a plan view of the machine illustrated in Figure 1 with a portion of the frame broken away to show underlying parts; Fig. 3 is a view in right elevation, partly in section of a portion of the machine shown in Figures 1 and 2; Fig. 4 is a detail sectional view illustrating on a larger scale some of the parts which appear in Fig. 3; Fig. 5 is a detail view partly in section illustrating a lasted shoe supported on the jack with the templet located in position and clamped to the outsole; Fig. 6 is a view in front elevation of the head of the machine showing the jack in its open position with the shoe unclamped from the jack, and also showing in dotted lines, the position to which the clamp for the templet is moved by gravity as soon as the shoe is unclamped; and Fig. 7 is a detail view illustrating a mechanism for moving the shoe outwardly as the edge trimming operation is completed.

The machine illustrated in the drawings as embodying the several features of the present invention is an automatic machine of the type illustrated and described in the patents to Topham No. 1,616,715, and No. 1,616,717, dated February 8, 1927, which type of machine comprises suitable tools or devices for performing an operation progressively along the bottom margin of a lasted shoe, a jack upon which the shoe is supported, and means for automatically controlling the movements of the jack so that no manual manipulation of the shoe by the operator is required during the operation.

The jack of the machine illustrated in the drawings comprises heel and toe supports 8 and 10 which are supported upon a vertical spindle 12 and which are actuated to clamp a lasted shoe automatically in proper position on the jack when the shoe is placed upon the jack by the operator and which are automatically actuated at the conclusion of the edge trimming operation to unclamp the shoe. This jack is the same in construction and mode of operation as the jack disclosed in applicant's prior Patent No. 1,689,594 dated October 30, 1928. During the sole rounding operation, the jack is moved in the direction of feed and is rotated to transfer the point of operation about the shoe from the breast line of the shoe at one side to the breast line at the other side, and simultaneously tipping movements are imparted to the jack to compensate for the transverse and longitudinal curvatures of the tread surface of the shoe sole. To enable the jack to be so actuated, it is mounted in the machine in the same manner as the jack of applicant's prior patent above referred to, and is acted upon by mechanism construction, arranged and operated as the corresponding mechanism of the machine of said patent.

Briefly stated, the jack supporting structure comprises an arm 14 in the forward end of which the lower end of the jack spindle 12 is rotatably mounted by means of a gimbal joint, a support 16 upon which the arm 14 is mounted to swing vertically, and a frame 18 pivotally mounted at its lower end in the machine base so as to be capable of swinging about a horizontal axis and upon which the support 16 is mounted to swing about a substantially vertical axis. The mechanism for moving the jack in the direction of feed, for rotating the jack and for imparting tipping movements to the jack, comprises a vertical pattern cam shaft 20 upon which a series of pattern cams 22 are mounted, and connections from the cam shaft to the jack and jack supporting structure comprising the feed lever 24 connected by the link 26 to the toe portion 10 of the jack, the cord 28 passing around a wheel mounted in the forward end of the arm 14 and connected through the gimbal joint to the jack spindle 12, and cam levers 32 and 34 connected respectively to the frame 18 and support 16. The cam shaft 20 is driven through nearly a complete revolution during the sole rounding operation on a shoe, whereupon an auxiliary mechanism is thrown into operation which moves the jack out of operative position toward the front of the machine, and the rotation of the cam shaft is continued to rotate the jack in a reverse direction to its original position. During this reverse rotation of the jack the heel and toe supports 8 and 10 are relatively actuated to unclamp the shoe from the jack. The mechanisms for actuating and controlling the jack during the sole rounding operation, for moving it outwardly at the conclusion of the operation, for reversely rotating it to its original position and for unclamping the shoe, are fully illustrated and described in applicant's prior patent above referred to, to which reference may be had for a full disclosure of the parts not indicated on the drawings.

To enable a sole edge to be produced having a regular and even outline throughout its entire extent, and having an exact predetermined size and shape, and an exact predetermined location with relation to the other parts of a shoe, regardless of irregularities in the shoe contours or variations and imperfections in the shape or arrangement of the various parts of the shoe produced during preceding shoe making operations, the machine illustrated in the drawings is provided with a templet, under guidance of which the edge trimming operation is performed upon the sole. This templet is indicated at 36, and consists of a rigid block of wood, the under surface of which, that is, the surface which contacts with the tread surface of the outsole of the shoe, is concaved both longitudinally and laterally to permit the templet to fit closely against the sole surface. In the construction illustrated in the drawings, the templet is designed to constitute a guide during the operation of the tool or tools around the forepart and shank only of the shoe, the operation terminating at both sides of the shoe at substantially the breast line of the completed shoe. Consequently, the templet is shaped to extend over the forepart and shank only, and is formed with a peripheral contour corresponding to the outline which the edge of the outsole is to have in these parts of the finished shoe. The templet when in use is located on the shoe with its peripheral contour at some distance inside of the sole edge.

To enable the templet to be located in exact predetermined position with relation to the last contour of the shoe, it is provided with positioning surfaces adapted to cooperate with corresponding positioning surfaces on the lasted shoe. The shoe illustrated in the drawings is one in which the parts have been assembled in accordance with the method disclosed in the patent to George E. Warren, No. 1,706,504, dated March 26, 1929. The outsole of this shoe is provided with a perforation near the heel end which was utilized in locating the outsole upon the lasted upper and insole. In the construction illustrated in the drawings, this perforation is utilized in locating the templet 36 on the outsole, a slot 38 being formed in the heel end of the templet, shaped to engage the head of a pin 40 projecting from the last 42 through the perforation above referred to. The engagement of the sides of the slot 38 with the head of the pin 40 determines accurately the position of the heel portion of the templet on the outsole laterally of the shoe. The position of the toe portion of the templet laterally of the shoe and also the position of the templet longitudinally of the shoe is determined by cooperating positioning surfaces consisting of the conical end of a pin 44 projecting from the sole engaging surface of the templet and a corresponding indentation 46 formed in a predetermined location in the surface of the sole adjacent the toe end. The pin 40, being in engagement with the hole in the last of the shoe, has a predetermined position with relation to the last contour. Likewise, the indentation 46 in the outsole of the shoe has an exact predetermined position with relation to the last contour, having been formed therein in any suitable manner, as for instance, by means of a sole marking machine forming the subject-matter of an application for patent filed by me of even date herewith.

After the shoe is placed on the jack and before it is moved into operating position with respect to the sole rounding tools, the templet is firmly clamped upon the lasted shoe. For this purpose, a clamping plate 48 is provided, arranged to engage the upper surface of the templet while the shoe is in clamped position on the jack. This plate is mounted by a ball and socket joint on the lower end of a plunger 50 which is arranged to slide in a vertical guideway in the outer end of a supporting arm 52. For actuating the plunger 50 to force the clamp 48 against the templet, a cam lever 54 is pivotally mounted in the outer end of the arm 52 and is provided with a cam slot 56 which is engaged by a pin 58 mounted in the plunger. For convenience of manipulation, both as regards placing the shoe with its templet on the jack and clamping the templet on the shoe, the supporting arm 52 is curved rearwardly and downwardly and is pivotally supported at its lower end on the lower portion of the heel portion 8 of the jack. In clamping the templet on the shoe, the arm is drawn forwardly so as to bring the clamp in the proper position and then the clamping lever 54 is actuated by hand to clamp the templet firmly to the shoe. At the conclusion of the trimming operation, however, as the jack is moved outwardly and the jack is reversely rotated, the shoe is automatically unclamped from the jack as hereinbefore described and this action of the jack in unclamping the shoe moves the shoe downwardly slightly so as to relieve the pressure of the clamp 48 against the templet. The templet is thus unclamped automatically simultaneously with the unclamping of the shoe from the jack, and the arm 52 supporting the clamp is allowed to fall by gravity to bring the clamp into the position indicated in dotted lines in Fig. 6. In its lowest position the arm 52 rests upon a spring 59, one end of which is secured to the heel support 8 of the jack and the other end of which extends beneath a shoulder at the lower end of the arm 52. To aid in this templet unclamping operation, and also to facilitate the positioning of the clamp 48 after a new shoe is placed on the jack, an adjustable set screw 60 is provided near the lower end of the supporting arm 52 and is arranged to bear against the heel support 8 of the jack.

The shoe supporting jack is yieldingly pressed inwardly as in the machine of applicant's prior patent and in order to cause the outsole of the shoe to be trimmed to a size and shape exactly predetermined by the size and shape of the templet, a fixed guide is provided against which the peripheral edge of the templet is held during the transfer of the point of operation of the rounding cutter about the shoe. This fixed guide is indicated at 62 and consists of a finger projecting downwardly from a block adjustably secured to an overhanging portion of the head of the machine by a bolt 64 passing through a slot in the block. By means of this adjustable connection the guide may be so located as to cause the desired amount of material to be removed by the trimming cutters. The guide 62 engages the templet at a point in line with the trimming cutter in the direction of the inward and outward movements of the jack so that the cutter always acts on the sole at the same distance from the periphery of the templet and a sole edge is produced having a regular and even outline throughout its extent and of a size and shape exactly predetermined by that of the templet. Also, in view of the fact that the templet is located in predetermined position with relation to the other parts of the shoe, and more particularly with relation to the last contour, the edge produced by the cutter will also have an exact predetermined location with relation to the other parts of the shoe and to the last contour.

The trimming cutters are mounted upon the lower end of a substantially vertical shaft 66 which constitutes the armature or rotor shaft of an electric motor mounted in an overhanging arm of the machine head. In trimming the outsole of a shoe to its final shape, it is often desirable to trim the shank portion of the shoe sole to a different shape, transversely of the edge, from the forepart. Accordingly, the edge trimming machine illustrated in the drawings is provided with two edge trimming tools of different shapes, one of which is designed to operate upon the forepart of the sole and the other upon the shank portion of the sole. Each of these tools comprises a hub and radial blades projecting therefrom, the forepart tool being indicated at 68 and the shank tool at 70. In order to enable these tools to be readily interchanged without disturbing the position of the jacked shoe, they are arranged to telescope one over the other, the forepart tool 68 being rigidly secured to the lower end of the shaft 66 and the shank tool being arranged to slide longitudinally of the shaft. The blades of the tools alternate, the blades of the tool 70 being located between the blades of the tool 68. The tool 70 is somewhat larger in diameter so that when the tool 70 is in its lowest position it forms a shield for the cutting blades of the forepart tool. When the shank tool is raised, the blades of the forepart tool are exposed and the forepart tool becomes operative. The forepart tool is locked to the shaft by means of a split collar 72 seated within the hub of the tool upon a tapered portion 74 at the lower end of the shaft. The collar 72 is forced upwardly on the tapered portion 74 by means of a clamping screw 76 and this clamping screw also serves to hold upon the lower end of the shaft or upon the tool 68 a guard plate 78 which is arranged to enter the crease between the projecting sole edge and the upper of a shoe being operated upon. This plate 78 also acts as a gage to control the vertical position of the sole. If desired, and as shown in the drawings, a third cutting tool may be provided in the form of a feather edger or burr remover. This tool is indicated at 80 and comprises a ring surrounding a hub on the shank tool 70 and provided with downwardly extending fingers which pass between the blades of the shank tool and are provided with shoulders resting upon the upper end of the forepart tool 68. A spring 82 coiled around the hub of the shank tool 70 and interposed between the tool 80 and a flange at the upper end of the hub of the shank tool tends to hold the shank tool in raised position.

An automatic edge trimming machine provided with interchangeable forepart and shank tools has heretofore been devised and is disclosed in the patent to Topham, No. 1,616,715, hereinbefore referred to. In that machine, however, the interchange of the tools was affected manually and it was necessary to stop the mechanism for feeding and controlling the jack during the interchange of the tools and then again throw this mechanism into operation. The edge trimming machine illustrated in the drawings of the present application overcomes this difficulty by the provision of means for automatically affecting the interchange of the tools so that the change is made during the continued operation of the machine and at exact predetermined points in the trimming operation without any attention on the part of the operator. To affect this interchange of the tools during the trimming operation, a cam is provided upon the pattern cam shaft 20 of the machine and suitable connections are provided between the cam and the shank tool 70. The cam which has been provided on the shaft 20 is indicated at 84 (see Fig. 2) and the connections between the cam and the shank tool comprise a lever 86 one end of which bears against the cam and the other end of which is connected by a link 88 to an arm projecting from a rock shaft 90. Another arm of this rock shaft is connected by a link 92 to the vertical arm of a bell crank 94, the horizontal arm of which is connected by a link 96 to one end of a lever 98. The other end of the lever 98 is arranged to bear against the outer upper end of a rod 100 arranged to slide axially in the shaft 66 and engaging at its lower end a pin 102 secured to the hub of the shank trimming tool and extending through a slot in the shaft 66. An actuation of these connections from the cam 84 will force the shank trimming tool downwardly into an operative position against the force of the spring 82 as will be obvious, and upon the passage of a low portion of the cam beneath the lever 86 the shank tool will be returned to its upper position by the spring 82.

In automatic machines of the type illustrated in the drawings in which an auxiliary mechanism is thrown into operation at the conclusion of the operation along the bottom margin of the shoe, which auxiliary mechanism moves the jack out of operative position and then completes the rotation of the cam shaft to rotate the jack in the reverse direction to its original position, there is a dwell in the movement of the shoe immediately preceding the outward movement of the jack. In machines of this type provided with tools which act upon the edge of the outsole, it has been found that this dwell in the movement of the shoe at the conclusion of the operation on the sole edge is likely to cause a slight imperfection in the sole edge, due to the continued contact of the tool or tools with the sole edge while the shoe is at rest. To overcome this defect, the machine illustrated in the drawings is provided with means acting at the conclusion of the operation on the sole edge to move the shoe outwardly so as to disengage the sole edge from the operating tool or tools. In the construction illustrated, this means comprises a plunger 104 mounted at one side of the edge trimming tool and arranged to move in a substantially horizontal direction transversely to the direction of feed of the shoe. The plunger is in the form of an arm pivotally mounted at its rear end upon the upper end of a swinging arm 106 and supported at its forward end by a bolt 108 projecting from the block carrying the guide 62 through a curved slot 110 in the arm. The construction and arrangement of these parts supporting the arm 104 is such that as the arm 106 is swung forwardly, the plunger 104 engages the shoe on the jack, and forces it outwardly out of contact with the trimming tools, the first portion of this movement being in a slightly downward direction. The arm 106 is conveniently actuated at the conclusion of the edge trimming operation from the pattern cam shaft 20 through a portion of the connections which are utilized in throwing in the stop motion to stop the cam shaft. To this end, the arm 106 is connected by means of a link 112 to one end of a lever 114 (see Fig. 2). This lever is pivotally mounted on the machine frame and extends over a roll 116 carried by a pivoted arm 118 which is arranged to be engaged by a stopping projection 120 secured to a gear wheel on the cam shaft 20. The arm 118 is pivotally mounted upon a bell crank 122 corresponding to the bell crank 576 of the machine disclosed in applicant's prior Patent No. 1,689,594.

The nature and scope of the present invention having been indicated and an embodiment of the several features of the invention having been specifically described what is claimed is:

1. An edge trimming machine having, in combination, an edge trimming tool, a shoe supporting jack movable to transfer the point of operation of the tool along the sole edge of a shoe containing a last supported on the jack and also movable transversely of the direction of feed to maintain the sole edge in contact with the tool, a templet, means for securing the templet in position on the sole of said shoe, and a guide fixed with relation to the tool and engaging the templet to determine the position of the shoe transversely of the direction of feed as the shoe is moved past said guide.

2. A shoe machine having, in combination, devices for operating upon a lasted shoe and a shoe supporting jack relatively movable to transfer the point of operation of said devices along the bottom margin of a shoe containing a last supported on the jack, a templet, a guide engaging the templet and cooperating therewith to determine the outline on the shoe followed by the operating devices, means for clamping a shoe containing a last on the jack, and additional clamping means for clamping the templet to the outsole.

3. A shoe machine having, in combination, devices for operating upon a lasted shoe and a shoe supporting jack relatively movable to transfer said devices along the bottom margin of a shoe containing a last supported upon the jack, a templet provided with positioning surfaces adapted to engage cooperating positioning surfaces on the outsole of the shoe, means for securing the templet in position on the outsole, and a guide engaging the templet, and cooperating therewith to determine the outline on the shoe followed by the operating devices.

4. A shoe machine having, in combination. devices for operating upon a lasted shoe and a shoe supporting jack relatively movable to transfer said devices along the bottom margin of a lasted shoe supported upon the jack, a templet provided with positioning surfaces adapted to engage cooperating positioning surfaces on the outsole of the shoe comprising a pin on the templet to engage a corresponding perforation in the toe portion of the outsole, means for securing the templet in position on the outsole, and a guide engaging the templet and cooperating therewith to determine the outline on the shoe followed by the operating devices.

5. A shoe machine having, in combination, devices for operating upon a lasted shoe and a shoe supporting jack relatively movable to transfer said devices along the bottom margin of a shoe containing a last supported upon the jack, a templet provided with positioning surfaces adapted to engage cooperating positioning surfaces on the outsole of the shoe comprising a slot to engage a pin projecting from the heel portion of the shoe, means for securing the templet in position on the outsole, and a guide engaging the templet and cooperating therewith to determine the outline on the shoe followed by the operating devices.

6. A shoe machine having, in combination, devices for operating upon a lasted shoe and a shoe supporting jack relatively movable to transfer said devices along the bottom margin of a shoe containing a last supported upon the jack, a templet removable from the machine, a clamp for holding the templet removably in position on the outsole, and a guide engaging the templet and cooperating therewith to determine the outline on the shoe followed by the operating devices.

7. A shoe machine having, in combination, devices for operating upon a lasted shoe and a shoe supporting jack relatively movable to transfer the operating devices along the bottom margin of a lasted shoe supported upon the jack, a templet slotted to engage a pin projecting from the heel portion of the shoe and provided with a pin to engage a corresponding perforation in the toe portion of the outsole, and means for securing the templet in position on the outsole and a guide engaging the templet and cooperating therewith to determine the outline on the shoe followed by the operating devices.

8. A shoe machine having, in combination, devices for operating upon a lasted shoe and a shoe supporting jack relatively movable to transfer the operating devices along the bottom margin of a lasted shoe supported upon the jack, a templet, means for clamping a lasted shoe on the jack, a clamp for holding the templet in position on the outsole arranged to unclamp the templet from the outsole upon the unclamping of the shoe from the jack, and a guide engaging the templet cooperating therewith to determine the outline on the shoe followed by the operating devices.

9. A shoe machine having, in combination, devices for operating upon a lasted shoe and a shoe supporting jack relatively movable to transfer the operating devices along the bottom margin of a lasted shoe supported upon the jack, a templet, slotted to engage a pin projecting from the last through the outsole and provided with a pin to engage a corresponding perforation formed in the outsole, a guide engaging the templet and cooperating therewith to determine the outline on the shoe followed by the operating devices and means for securing the templet in position on the shoe.

10. A shoe machine having, in combination, devices for operating upon a lasted shoe and a shoe supporting jack relatively movable to transfer the operating devices along the bottom margin of a lasted shoe supported upon the jack, a templet, a guide engaging the templet and cooperating therewith to determine the outline on the shoe followed by the operating devices, and a clamping device pivotally secured to the jack for clamping the templet to the shoe sole.

11. A shoe machine having, in combination, devices for operating upon a lasted shoe and a shoe supporting jack relatively movable to transfer the operating devices along the bottom margin of a lasted shoe supported upon the jack, a templet, a guide engaging the templet and cooperating therewith to determine the outline on the shoe followed by the operating devices, and means for clamping the templet to the shoe sole comprising an arm pivotally secured to the jack, a plunger mounted in the arm for engaging the templet, and a cam lever mounted on the arm for actuating the plunger.

12. An edge trimming machine having, in combination, two edge trimming tools arranged to act successively on different parts of the sole edge of a shoe and a shoe supporting jack relatively movable to transfer the point of operation of a tool along the sole edge of a shoe supported on the jack, and means acting automatically during the continued operation of the machine to interchange one tool for the other at a predetermined point in the operation along the sole edge.

13. An edge trimming machine having, in combination, a forepart edge trimming tool, a shank edge trimming tool, a shoe supporting jack movable to transfer the point of operation of a tool along the sole edge of a shoe supported on the jack, and mechanism acting automatically to cause the shank edge trimming tool only to be in operative position while the point of operation is being transferred along the shank and forepart edge trimming tool only to be in operative position while the point of operation is being transferred along the forepart of the sole.

14. An edge trimming machine having, in combination, an electric motor, a forepart edge trimming tool and a shank edge trimming tool directly connected to rotate with the rotor of the motor and mounted for relative movement to bring them alternatively into operative position, a shoe supporting jack movable to transfer the point of operation of a tool along the sole edge of a shoe supported on the jack, and means acting automatically to move relatively the edge trimming tools to interchange one tool for the other at a predetermined point in the operation along the sole edge.

15. An edge trimming machine having, in combination, an electric motor, a forepart and a shank edge trimming tool mounted on the rotor shaft of the motor to rotate therewith, a spring for holding the shank edge trimming tool out of operative position on the rotor shaft, a rod mounted in the rotor shaft to engage with the shank edge cutter, a work supporting jack movable to transfer the point of operation of the tool along the sole edge of a shoe supported on the jack, and means for actuating the rod to move the shank edge setting tool into operating position at a predetermined point in the operation along the sole edge.

16. An edge trimming machine having, in combination, a rotary shaft, means for rotating the shaft, an edge cutting tool mounted to turn with the shaft, and a second edge cutting tool mounted to rotate with and slide on the shaft, said tools being telescopically arranged to permit the slidingly mounted tool to shield the other tool when in one position and to expose the other tool when in another position whereby the tools may be interchanged for operation on a sole edge.

17. An edge trimming machine having, in combination, a rotary shaft, means for rotating the shaft, a forepart edge cutting tool mounted to rotate with the shaft, and a shank edge cutting tool mounted to rotate with and slide on the shaft and telescopically arranged with relation to the forepart edge cutting tool to shield the forepart edge cutting tool when in one position and to expose the forepart edge cutting tool when in another position whereby the tools may be interchanged for operation on a sole edge.

18. A shoe machine having, in combination, two tools arranged to act successively on different parts of the sole edge of a shoe, a shoe supporting jack movable to transfer the point of operation of a tool along the sole edge of a shoe supported on the jack, and also movable transversely of the direction of feed to maintain the sole edge in contact with the tool, and means acting automatically during the continued operation of the machine to interchange one tool for the other at a predetermined point in the operation along the sole edge.

19. A shoe machine having, in combination, a forepart edge tool, a shank edge tool, a shoe supporting jack longitudinally movable and rotatable to transfer the point of operation around the sole of a shoe supported on the jack, and means acting automatically during the continued operation of the machine to interchange the forepart tool for the shank tool at a predetermined point in the operation along the sole edge at one side of the shoe and to interchange the shank tool for the forepart tool at a predetermined point in the operation along the sole edge at the opposite side of the shoe.

20. An edge trimming machine having, in combination, two edge trimming tools arranged to act successively on different parts of the sole edge of a shoe, a shoe supporting jack movable to transfer the point of operation of a tool along the sole edge of a shoe supported on the jack, a guide past which the shoe is moved to transfer the point of operation along the sole edge and which determines the position of the shoe transversely of the direction of feed, and means acting automatically during the continued operation of the machine to interchange one tool for the other at a predetermined point in the operation along the sole edge.

21. An edge trimming machine having, in combination, a rotary shaft, means for rotating the shaft, a forepart and a shank edge trimming tool mounted on the shaft to rotate therewith and to have a relative movement longitudinally of the shaft, said tools being telescopically arranged to permit one tool to shield the other tool when in one position and to expose the other tool when in another position, a spring for holding one tool out of operative position on the shaft with the other tool exposed in operative position, and means for moving the inoperative tool into operative position to shield the other tool comprising a rod mounted in and extending longitudinally of the shaft, and connections between the rod and said inoperative tool.

22. A shoe machine having, in combination, a tool for operating upon the sole edge of a shoe, a shoe supporting jack, movable to transfer the point of operation of the tool along the sole edge of a shoe supported on the jack, and also movable transversely of the direction of feed to maintain the sole edge in contact with the tool, and means acting automatically at the conclusion of the operation on the sole edge and during the continued movement of the jack to move the shoe outwardly transversely of the direction of feed to relieve the pressure of the tool against the sole edge.

23. A shoe machine having, in combination, a tool for operating upon the sole edge of a shoe, a shoe supporting jack, movable to transfer the point of operation of the tool along the sole edge of a shoe supported on the jack, and also movable transversely of the direction of feed to maintain the sole edge in contact with the tool, a shoe engaging plunger, and means for moving the plunger into engagement with the shoe at the conclusion of the operation on the sole edge to move the shoe outwardly transversely of the direction of feed to relieve the pressure of the tool on the sole edge.

In testimony whereof I have signed my name to this specification.

ALFRED R. MORRILL.